Feb. 15, 1966   W. L. COWAN   3,235,246
SAFETY QUICK-RELEASE COUPLING DEVICE
Filed Jan. 15, 1964

INVENTOR.
WILLIAM L. COWAN.
BY *Barthel & Bugbee*
ATTORNEYS

United States Patent Office 3,235,246  
Patented Feb. 15, 1966

3,235,246  
SAFETY QUICK-RELEASE COUPLING DEVICE  
William L. Cowan, St. Clair Shores, Mich., assignor to Scientific Products, Inc., Detroit, Mich., a corporation of Michigan  
Filed Jan. 15, 1964, Ser. No. 337,866  
8 Claims. (Cl. 268—59)

This invention relates to quick-release mechanism for manually disconnecting two sliding travelers or carriages, and is particularly useful in disconnecting an overhead sliding door from an electrically-actuated door operator.

Hitherto, overhead sliding doors have been widely used for garages, warehouses, factories and other buildings where the entry and departure of vehicles occurs frequently. Occasionally, however, an emergency, such as a fire or power shutoff, occurs which renders the electrically-actuated door operator temporarily inoperative. Under such circumstances, it is essential to provide means for manually raising and thereby opening the door to permit the release of persons who would otherwise be trapped within the building. The present invention provides a simple and effective safety quick-release coupling device for such equipment.

Accordingly, one object of the invention is to provide a safety quick-release coupling device for disconnecting a sliding driven traveler or carriage from a sliding power-actuated driving traveler or carriage so that the driven carriage may be separated or disconnected from and moved manually independently of the driving carriage.

Another object is to provide a safety quick-release coupling device of the foregoing character wherein the sliding driving and driven carriages are drivingly connected to one another by a cam-operated arrangement which normally insures a positive coupling connection but which can be instantly disconnected by a simple manual action to effect separation thereof.

Another object is to provide a safety quick-release coupling device of the foregoing character wherein automatic recoupling of the driven traveler or carriage with the driving member is easily effected either by moving the driven carriage into coupling engagement with the driving carriage or by operating the power-actuated mechanism for moving the driving carriage into coupling engagement with the driven carriage, whereupon subsequent use of the power-driven operator actuates the operator for moving the driven carriage in either of its opposite directions of travel.

Another object is to provide a safety quick-release coupling device of the foregoing character wherein the driven carriage has a coupling extension or tongue which is engageable on one side with an abutment on the driving carriage and on its opposite side by a manually-releasable wedging or cam device so as to selectively releasably effect a separable driving connection between the driving and driven carriages.

Other objects and advantages of the invention will become apparent during the course of the following description of the accompanying drawings wherein.

Figure 1:
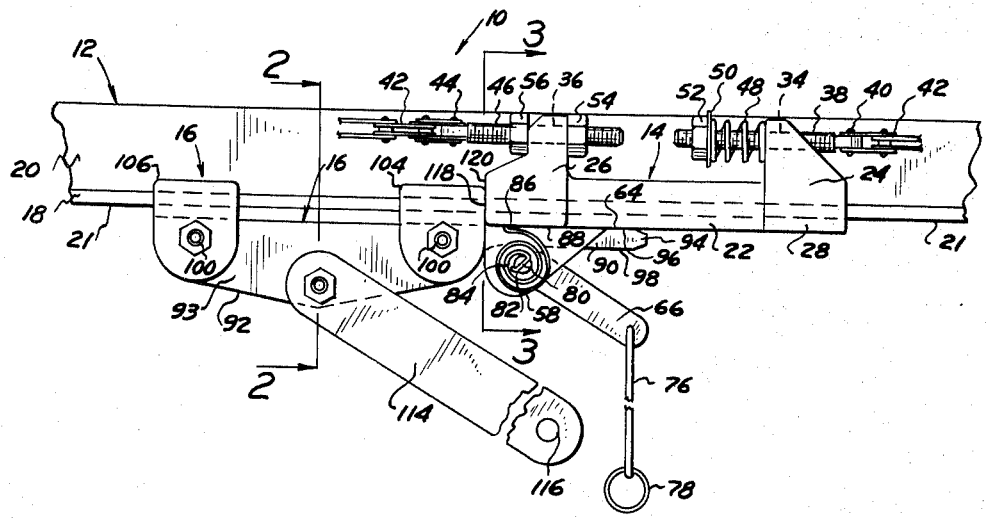
FIGURE 1 is a fragmentary side elevation of the guide rail of a power-driven overhead door operator equipped with a safety quick-release coupling device according to one form of the invention.
Figure 3:
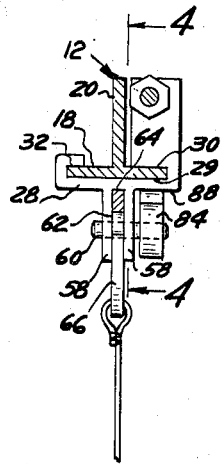
Figure 4:
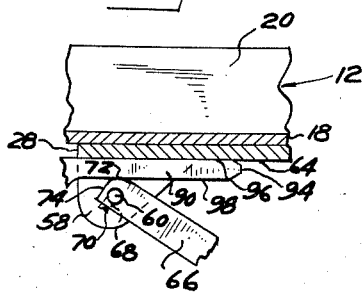

FIGURE 3 is a cross-section taken along the line 3—3 in FIGURE 1, showing details of the releasable coupling connection between the driving and driven carriages; and FIGURE 4 is a fragmentary vertical longitudinal section taken along the line 4—4 in FIGURE 3, showing the safety coupling release lever in its camming or wedging position forcing the coupling extension or tongue of the driven carriage into locking engagement with the driving carriage.

Referring to the drawing in detail, FIGURE 1 shows a safety quick-release coupling device, generally designated 10, as mounted for sliding motion along the horizontal guide structure or guide rail 12 of a conventional overhead sliding door (not shown) according to one form of the invention and having a driving carriage or traveler 14 and a driven carriage or traveler 16 adapted normally to move together in coupled relationship along the guide rail 12 but capable of quick disconnection or uncoupling in an emergency or when otherwise desired, according to the invention, as described below. The guide rail 12 is normally secured to the ceiling of the garage or other building in a conventional manner, such as by brackets (not shown) depending from the ceiling, as is well known to those skilled in the overhead door art and hence requiring no description. The guide rail 12 is illustrated as being of T-section with a horizontal flange 18 and vertical web 20 (FIGURES 2 and 3), the flange 18 having a flat lower surface 21. It will be understood that guide rails of other cross-sectional shape, such as channel sections, I-sections and the like, may also be used, likewise box sections or tubular guide rails of circular cross-section.

The driving carriage or traveler 14 includes an elongated horizontal base member 22 (FIGURE 1) which extends along one side of the guide rail 12 and which has upstanding rearward and forward lugs or brackets 24 and 26 respectively spaced longitudinally apart from one another at opposite ends of the base 22. Each of the lugs or brackets 24 and 26 is approximately L-shaped with a horizontal portion 28 having a flat upper surface 29 extending beneath and slidably engaging the correspondingly flat lower surface 21 of the guide rail flange 18 (FIGURE 3) and having grooves 30 and 32 at opposite sides thereof loosely but slidably engaging opposite edges of the flange 18. The lugs 24 and 26 are provided with aligned horizontal bores 34 and 36 respectively. The bore 34 of the rearward lug 24 slidably receives a threaded rearward rod or pin 38, one end of which is bored transversely to receive a pivot pin 40 connecting it to one end of a traction chain 42, the opposite end of which is similarly pivotally connected by the pivot pin 44 to the end of a similar threaded forward rod or pin 46 slidably engaging the bore 36 in the forward lug 26. Mounted forward of the rearward lug 24 on the threaded rod 38 is a compression cushioning spring 48, the forward end of which abuts a washer 50 held in place by an adjusting nut 52 threaded upon the forward end of the rod 38. The forward threaded rod 46 is adjustably held in engagement with the forward lug 26 by nuts 54 and 56 threaded upon the rod 46 on opposite sides of the forward lug 26.

Depending from the forward lug 26 are spaced parallel ears 58 which are bored transversely to receive a pivot pin or axle 60 extending across a slot 62 between the ears 58. The upper end of the slot 62 has a bottom surface 64 extending along the bottom of the base 22 and serving as a coupling abutment surface in the manner described below. The slot 62 and abutment surface 64 constitute a coupling portion receiver. Pivotally mounted on the pivot pin 60 is a safety quick-release cam lever 66, the upper end of which is bored and threaded as at 68 (FIGURE 4) to receive a set screw 70 which engages a flat on the pin 60 to provide a driving connection with the pin 60. The upper end of the lever 66 is provided with a rounded cam hump 72, the top of which is at a greater radial distance from the axis of the axle or pin 60 than an adjacent low portion or flat portion 74. The lower end of the cam lever 66 is drilled to receive the upper end of a pull cable or chain 76, the lower end of which carries a pull ring 78. In order to hold the lever 66 in its raised position (FIGURES 1, 3 and 4), one end of the axle 60 is slotted as at 80 to receive the inner end 82 of a spiral torsion spring 84, the outer end 86 of which is flattened and angled so as to rest against the adjacent undersurface 88 of the forward lug 26 as an abutment.

Projecting rearwardly through the slot 62 between the ears 58 is a coupling portion in the form of a tongue or extension 90 of the elongated base 92 of the driven carriage or traveler 16. The coupling tongue 90 is beveled at its rearward end 94 and has parallel flat upper and lower surfaces 96 and 98 which are engaged respectively in releasable coupling engagenemt by the abutment surface 64 between the ears 58 on the bottom of the base 22 and the cam hump 72 on the upper end of the safety quick release lever 66 (FIGURE 4).

Figure 2:
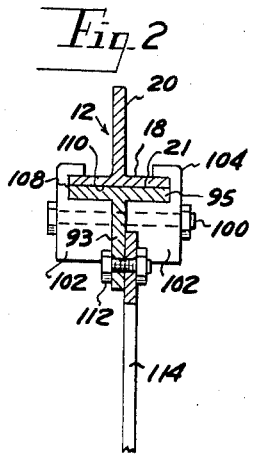
FIGURE 2 is a cross-section taken along the line 2—2 in FIGURE 1, showing details of the driven carriage.

The base 92 of the driven carriage or traveler 16 is of T-shaped cross-section (FIGURE 2) with its web 93 and flange 95. The web 93 is drilled transversely at its forward and rearward ends to receive bolts 100. The bolts 100 pass through the correspondingly drilled lower portions of the oppositely-facing halves 102 of rearward and forward brackets 104 and 106 respectively. The upper portions of the halves 102 of the forward and rearward brackets 106 and 104 are provided with opposite grooves 108 facing one another (FIGURE 2) and extending around the edges of the flanges 95 and 18 of the base 92 and guide rail 12 respectively. The flange 95 has a flat upper surface 110 to facilitate sliding engagement with the flat lower surface 21 of the flange 18 of the guide rail 12 (FIGURE 2).

Approximately midway between the forward and rearward brackets 106 and 104, the base web 93 is drilled transversely to receive a pivot bolt 112 which also passes through the correspondingly drilled upper end of a draw bar or load-moving bar 114. The opposite end is drilled transversely as at 116 for pivotal connection to the load to be moved, such as a panel of an overhead door (not shown). The rearward bracket 104 has a rearward abutment surface 118 which is engageable with a forward abutment surface 120 of the forward lug 26 when the safety power drive disconnecting device 10 is in its driving condition shown in FIGURE 1.

In the normal operation of the safety quick-release coupling device 10 of the invention, let it be assumed that the door or other load connected to the draw bar 114 is in its lowered condition with the parts in their positions shown in FIGURE 1 and that the door is to be raised by means of the motor-driven mechanism connected to the traction chain 42. When the motor thereof (not shown) is operated in a forward direction, the chain 42 moves to the left, pulling the drive carriage 14 along with it to the left. When this occurs, the forward abutment surface 120 of the rearward drive carriage 14 engages the rearward abutment surface 118 of the forward driven carriage 16 and pushes the latter ahead of it along the guide rail 12. As the forward driven carriage 16 moves to the left in this manner (FIGURE 1), the resulting leftward travel of the draw bar 114 pulls the load, such as the overhead door, along with it and raises the door to its open position.

To close the door or lower the load, the driving motor is reversed, causing the traction chain 42 and drive carriage 14 to move to the right (FIGURE 1), the consequent pull of the cam hump 72 against the lower surface 98 of the extension or tongue 90 of the driven carriage 16 forcing the coupling tongue 90 upward so that its upper surface 96 frictionally engages the abutment surface 64 at the upper end of the slot 62 between the ears 58 (FIGURE 3). Since the cam portion 72 is urged by the spiral torsion spring 84 and consequent counterclockwise rotation of the axle 60 firmly against the lower surface 98 of the coupling tongue 90, the base 92 of the driven carriage 16 is pulled in coupled relationship along the guide rail 12 to the right as the drive carriage 14 is pulled to the right by the traction chain 42.

In the emergency operation of the safety quick-release coupling device 10, let it be assumed, as before, that the door or other load connected to the draw bar 114 is in its lowered position with the parts in the positions shown in FIGURE 1, and that an emergency has arisen wherein the driving motor which operates the traction chain 42 has become inoperative, such as by a power shut-off. This action, in effect, locks the drive carriage 14 in its attained position and, without the presence of the device 10, would prevent opening of the door and thus trap the occupants or vehicles within the building.

To open the door manually in such a situation, the user pulls downward upon the pull ring 78 of the cable 76, thereby swinging the safety release cam lever 66 downward in a clockwise direction and consequently moving the cam hump 72 (FIGURE 4) in a clockwise direction out of coupling engagement with the lower surface 98 of the coupling tongue or extension 90 of the base 92 of the driven carriage 16. This action disengages the upper surface 96 of the coupling tongue 90 of the driven carriage 16 from its normal frictional coupling engagement with the abutment surface 64 of the drive carriage base 22, releasing the coupling tongue 90 from driven coupled engagement with the drive carriage 14. While holding the pull ring 78 and cam lever 66 in their downwardly-moved positions just described, the user or his assistants pushes upward on the door or draw bar 114 connected to the door, causing the driven carriage 16 to travel independently to the left along the guide rail 12 in a direction away from the now stalled drive carriage 14. The instant the coupling tongue 90 of the driven carriage base 92 moves out of the slot 62 between the ears 58, the driven carriage 16 thus becomes completely uncoupled from and independent of the drive carriage 14 and may be moved freely by means of its draw bar connection 114, so that the pull cable 76 and safety release lever 66 can be released, whereupon the torsion spring 84 rotates the axle 60 to swing the lever 66 upward.

When power has been resumed, the driving motor is restarted to move the drive carriage 14 to the left along the guide rail 12 by the travel of the traction chain 42 to the left. When the drive carriage 14 overtakes the driven carriage 16, the slot 62 and the ears 58 move along the coupling tongue 90, the beveled end 94 of which pushes the cam bump 72 aside in a clockwise direction (FIGURE 4), overcoming the thrust of the torsion spring 84 sufficiently to permit full entry of the tongue 90 into the slot 62. As soon as the forward abutment surface 120 of the drive carriage 14 engages the rearward abutment surface 118 of the driven carriage 16, the two carriages 14 and 16 become fully coupled. If the door or other load has only been lifted partway upward to a partially open position, in order to release the occupants from the building, the further travel of the drive carriage 14 to the left pushes the driven carriage 16 to the left along the guide rail 12 to move the door upward to its fully open position. Reversal of the driving motor moves the drive carriage 14 to the right, pulling the driven carriage 16 along with it because of the engagement of the cam hump 72 with the coupling tongue 90 brought about by the counterclockwise rotation of the axle 60 by the torsion spring 84 in the manner previously described. This action pulls the door downward to its closed position, whereupon the limit switches customarily provided with such installations halt the motor.

What I claim is:

1. A safety quick-release coupling device for selectively coupling and uncoupling a load from a prime mover, said coupling device comprising an elongated supporting guide structure,
a power-driven flexible traction member movable adjacent and along a portion of said guide structure,
a driving carriage slidably mounted upon said guide structure and connected to said traction member for propulsion thereby to and fro along said guide structure, a driven carriage also slidably mounted on said guide structure for travel to and fro therealong into and out of proximity to said driving carriage,
   one of said carriages having a coupling portion including an extension projecting toward the other carriage approximately parallel to said guide structure and said other carriage having a coupling portion receiver thereon including a passageway disposed in alignment with said coupling portion and having a coupling surface engageable with said extension,
a load connection member secured to said driven carriage,
and means mounted on one of said carriages for selectively urging said coupling portion into and out of coupled engagement with said receiver.

2. A safety quick-release coupling device, according to claim 1, wherein said carriages have abutment portions engageable with one another in the coupled condition thereof.

3. A safety quick-release coupling device according to claim 2, wherein said abutment portions comprise contact surfaces disposed on the adjacent ends of said carriages.

4. A safety quick-release coupling device, according to claim 1, wherein said urging means includes a cam element movably mounted adjacent said coupling portion receiver and an operating element operatively connected to said cam element and constructed and arranged to selectively move said cam element into and out of engagement with said coupling portion.

5. A safety quick-release coupling device, according to claim 4, wherein said urging means also includes a resilient element connected to said cam element and normally urging said cam element into coupling engagement with said coupling portion.

6. A safety quick-release coupling device, according to claim 4, wherein said operating element comprises a lever pivotally mounted on its respective carriage and operatively connected to said cam element.

7. A safety quick-release coupling device, according to claim 6, wherein said cam element is mounted on said lever and rotates into and out of coupling engagement with said coupling element in response to the swinging of said lever in opposite directions.

8. A safety quick-release coupling device, according to claim 4, wherein said other carriage has ears projecting transversely therefrom, and wherein a pivot element is mounted on said ears and extends across said passageway, said lever being pivotally mounted on said pivot element.

References Cited by the Examiner
UNITED STATES PATENTS

| | | | |
|---|---|---|---|
| 2,753,179 | 7/1956 | Hahn | 268—59 X |
| 3,051,014 | 8/1962 | Houk | 268—59 X |
| 3,066,729 | 12/1962 | Gessell | 268—59 X |

HARRISON R. MOSELEY, *Primary Examiner.*